M. R. HUTCHISON.
CLINCHER TIRE AND SECURING LUG THEREFOR.
APPLICATION FILED NOV. 20, 1908.
1,038,143.
Patented Sept. 10, 1912.
3 SHEETS—SHEET 1.
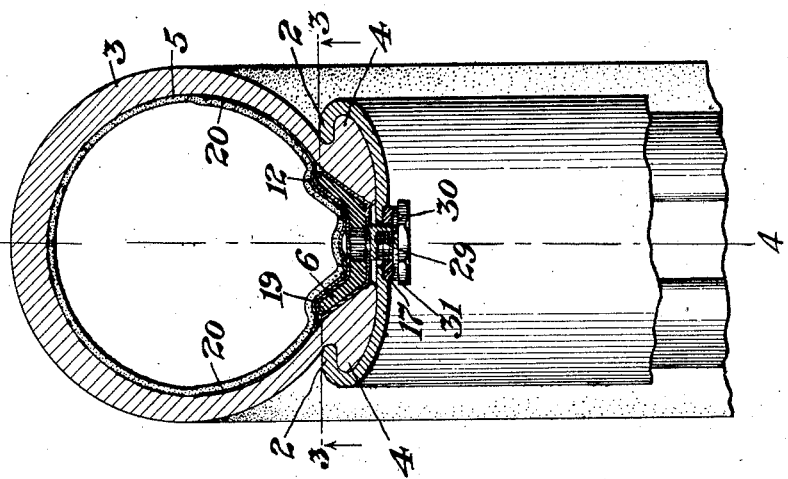
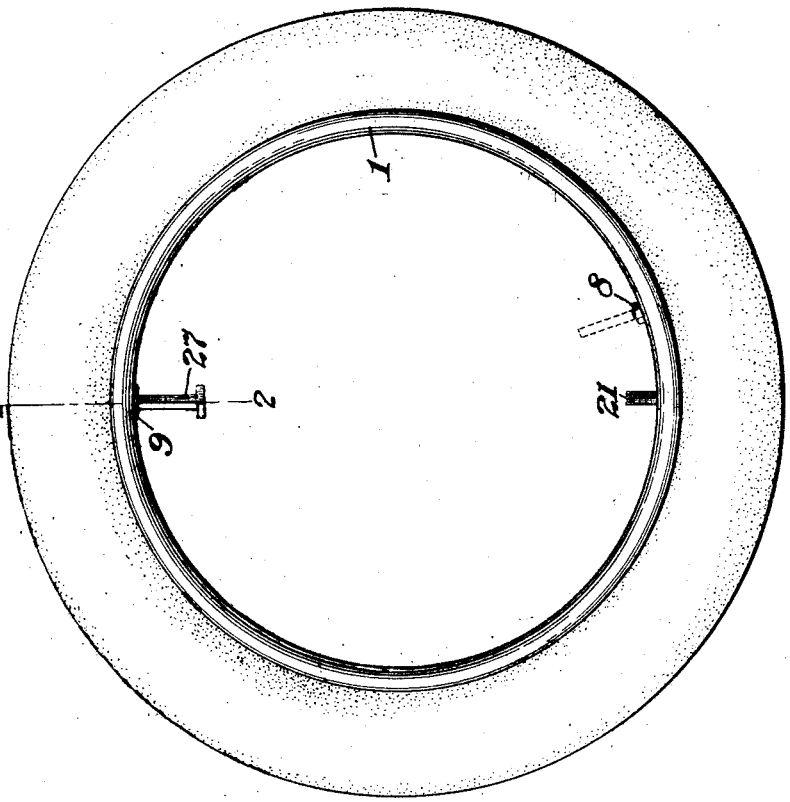
WITNESSES
Chas. F. Clagett
INVENTOR
Miller Reese Hutchison
BY
G. C. Dean ATTORNEY.

M. R. HUTCHISON.
CLINCHER TIRE AND SECURING LUG THEREFOR.
APPLICATION FILED NOV. 20, 1908.
1,038,143.
Patented Sept. 10, 1912.
3 SHEETS—SHEET 2.
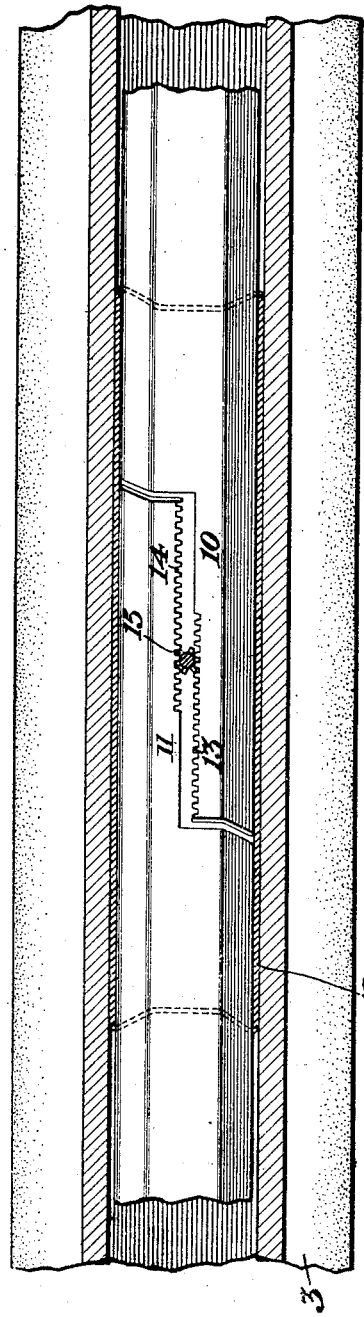
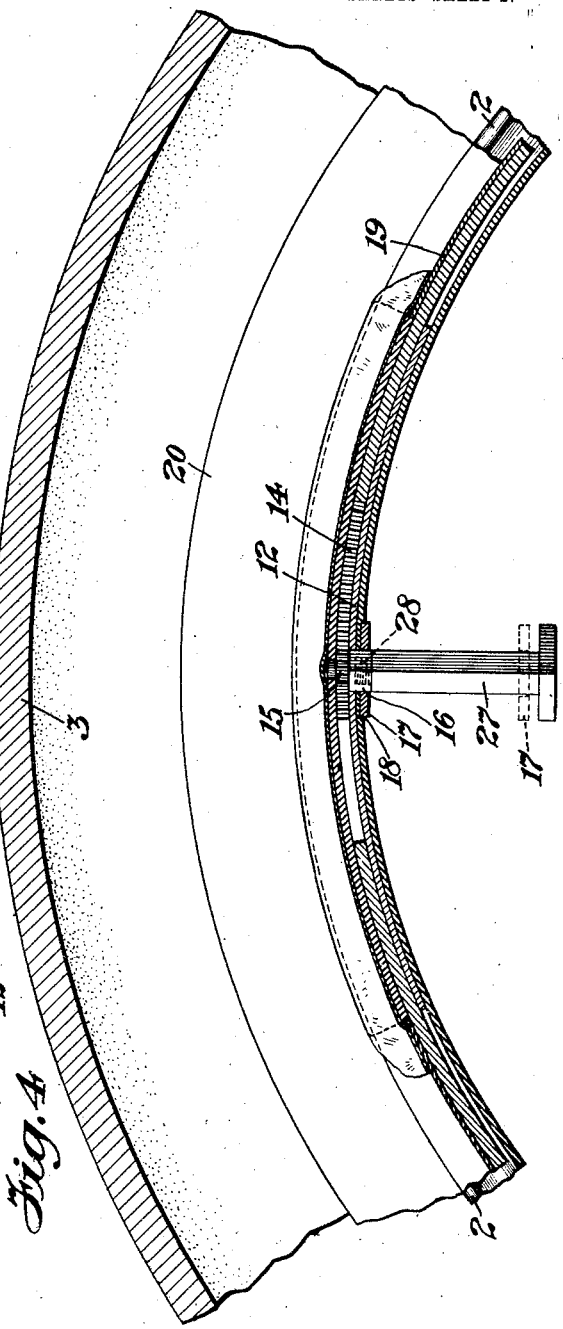
WITNESSES
INVENTOR
Miller Reese Hutchison
BY
G. C. Allan ATTORNEY M. R. HUTCHISON.
CLINCHER TIRE AND SECURING LUG THEREFOR.
APPLICATION FILED NOV. 20, 1908.
1,038,143.
Patented Sept. 10, 1912.
3 SHEETS—SHEET 3.
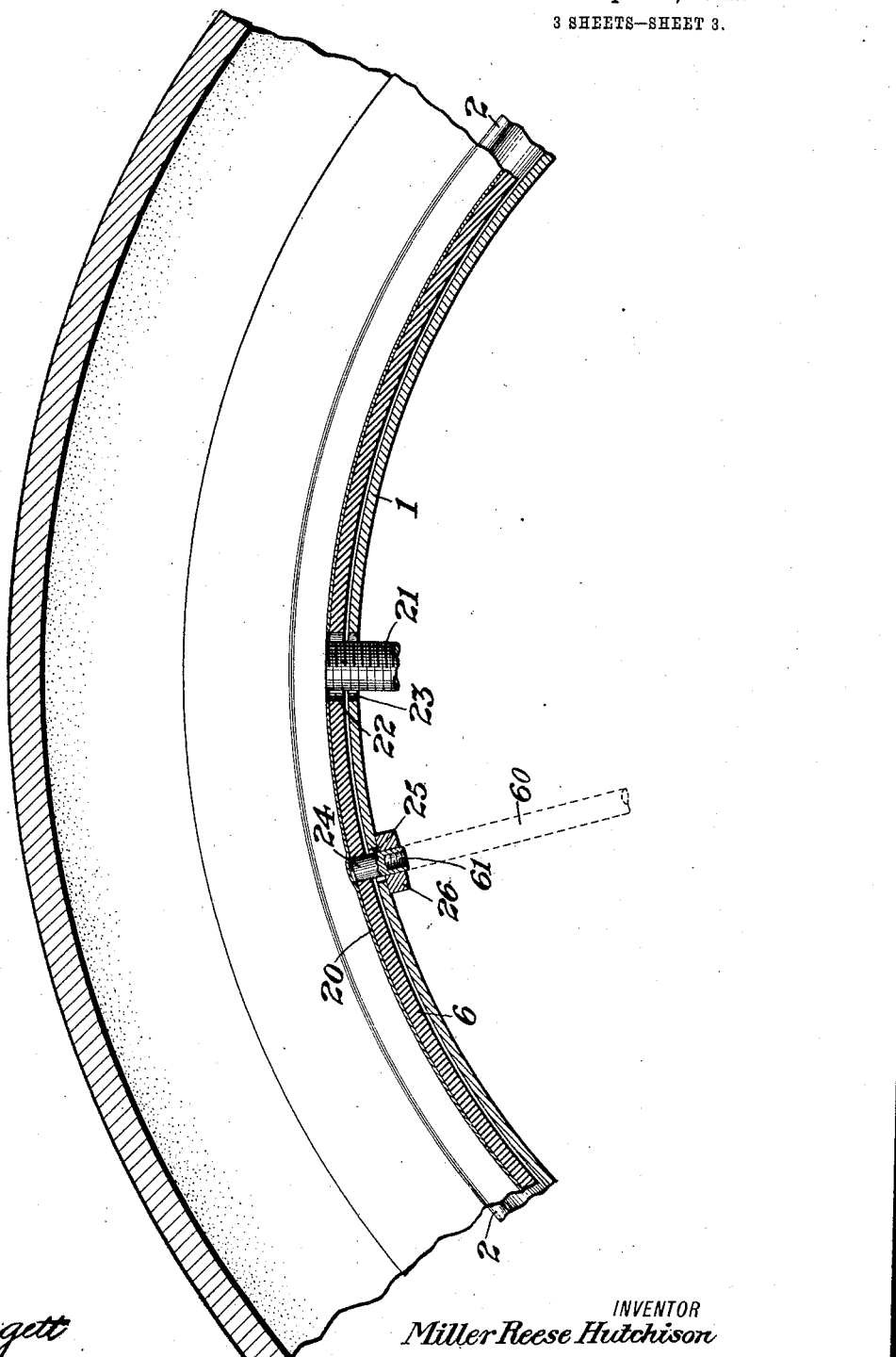
WITNESSES
INVENTOR
Miller Reese Hutchison
BY
ATTORNEY

UNITED STATES PATENT OFFICE.

MILLER REESE HUTCHISON, OF SUMMIT, NEW JERSEY.

CLENCHER-TIRE AND SECURING-LUG THEREFOR.

1,038,143. Specification of Letters Patent. Patented Sept. 10, 1912.

Application filed November 20, 1908. Serial No. 463,695.

*To all whom it may concern:*

Be it known that I, MILLER REESE HUTCHISON, a citizen of the United States, and a resident of Summit, in the county of Union and State of New Jersey, have invented certain new and useful Improvements Relating to Clencher-Tires and Securing-Lugs Therefor, of which the following is a specification.

My present invention relates to certain improvements particularly applicable to pneumatic tires of the type in which an outer shoe approximately U shaped in cross-section is clenched to the wheel rim by means of marginal projections or annular beads adapted to hook under corresponding in-turned annular lips on the rim. The shoe is flexible, but relatively hard and inelastic so as to afford durable covering and confining means for a more elastic inner tube containing air under high pressure.

My present invention includes a tire of the above type, in combination with a continuous wedging strip held in wedging relation between the inner marginal walls of the shoe of the tire by a peripheral tension longitudinally of the strip. The strip is provided with overlapped ends, and preferably with a take-up and means for locking the same against circumferential enlargement when in use.

Having thus described something of the nature and objects of my invention, I will describe certain practical embodiments thereof in connection with the accompanying drawings, in which—

Figure 1 is an elevation of a clencher tire and rim adapted for the use of my invention; Fig. 2 is a vertical section transversely of the tire taken on the line 2—2, Fig. 1; Fig. 3 is a section partly on the line 3—3, Fig. 2, but showing adjacent ends of the lug and the take up therefor. Fig. 4 is a vertical section taken on the line 4—4, Fig. 2, showing the locking means for the lug removed and a wrench in position for operating the take up. Fig. 5 is a section on the same plane, but showing means for anchoring the lug adjacent the valve stem.

The parts of the wheel shown comprise a rim 1, which in this case is of the general form commonly employed for detachable rims, though so far as concerns my present invention it is not material whether the rim be detachable or not. In any case, the outer side of the rim is formed with in-turned edges forming opposite locking lips 2, 2. The covering or shoe 3 is of any known or desired type and is provided with ribs or locking projections 4, 4, adapted to engage the in-turned ribs 2—2 on the rim. The inner tube 5 is of any known or desired construction. When this tube is inflated, the ribs 4, 4 of the shoe are held by the air pressure in engagement with the ribs 2—2. The tire lug 6 has the cross-sectional shape indicated in Fig. 2. This shape and also the manner of the engagement of the lug with the shoe for wedging or locking the latter to the rim, may be much the same as in the case of the short lugs now common and well known in the art. In my device, however, the lug extends around the periphery of the wheel. Where the lug comprises a continuous band of channel iron, it is anchored adjacent the valve stem on one side of the wheel, as indicated at 8, and extends around to the joint at 9 on the diametrically opposite side of the wheel, the cross-section being preferably uniform entirely around the circumference, except at the joint, where the meeting ends are cut away and overlapped, as indicated at 10, 11, Fig. 3. At this point the overlapped portions are completely inclosed in a sheath 12, which has substantially the same external and internal contours as has the lug strip inclosed thereby. This sheath 12 thus serves as the lug at the point in the periphery where the overlap occurs. From these figures, it will be seen that the adjacent edges of the cut away and overlapped portions 10, 11 of the lug strip are formed with racks 13, 14 engaged by a pinion 15, which is journaled in the inclosing sheath 12 and is integral with or keyed to a stud 16, which may be rotated in the manner hereinafter described in order to operate the pinion to take up the overlapping sections of the lug strip. The stud 16 is squared on the outside, as shown in Fig. 100 4, and engages the square washer 17 adapted to fit into the square recess 18 in the underside of the rim 1. The square cross-section is intended for locking purposes, and any other polygonal or irregular cross-section 105 capable of serving the same function may be employed. It will be understood that when the washer 17 is in the recess 18, the pinion 15 is locked, thereby holding the racks 13 and 14 and, through them, the end sections 10, 11 of the lug in fixed relation. When the pinion is to be operated, the washer 17 must be removed from the recess, as will be explained hereinafter.

The channel of the sheath 12 is lined with a strip of leather 19, which is continuous circumferentially and which is preferably extended a considerable distance up the inner wall of the shoe, as indicated at 20, 20, Fig. 2, thereby effectually masking the edge of the lug strip and also affording an additional supporting strength throughout the region of the shoe where the walls are thinnest and weakest.

I prefer to make the lug strip of elastic material having a normal curvature which will cause the strip when unlocked to open automatically to the maximum diameter desired for assembling of the parts.

The parts as above described, may be assembled and locked in the position shown in Fig. 2 in the following manner: One locking bead 4 of the shoe 3 is assembled in engagement with one rib 2 of the rim 1. The lug strip in its normal expanded condition is placed against the inner face of the shoe on the side thus interlocked. The inner tube 5 is inserted through the opening on the side where the shoe is still detached from the rim. The material of the inner air tube is distributed with the usual care and precaution commonly employed in this connection. The valve stem indicated at 21, Fig. 5, is inserted through the opening 22 in the lug strip and through the corresponding opening 23 in the rim. The anchoring bolt 24 of the lug strip 6 is inserted in the opening 25 located in the rim 1 adjacent the valve stem opening and the securing nut thread 26 is partially screwed up. The inner tube 5 being partially inflated, the other side of the shoe through which it was inserted is forced into clenching engagement with the other rib 2, thereby closing the shoe. The parts are thus in the general relation indicated in all of the figures, except that the inner tube has not been fully expanded and the lug strip has not been tightened down into wedging relation. To effect this part of the operation, the wrench 27, Figs. 1 and 4, is screwed into the threaded recess 28 in stud 16, the washer 17 being then in the position indicated in dotted lines, Fig. 4. The wrench is turned to the left, thereby rotating the pinion 15 engaging the racks 14, thus taking up the lug strip, decreasing its diameter, and so forcing it into wedging relation with the inner walls of the shoe. This locks the shoe in the clenching position. When the take up has been operated as far as practicable in this way, additional air pressure is applied in the inner tube, thereby forcing the lug strip into more forceful wedging relation with the shoe. When the full pressure of the inner tube has been reached and the overlapping sections have been fully taken up, the operator slides the washer 17 up the squared shank of the wrench 27, and fits it into engagement with the square recess 18, thereby locking the pinion against rotation. If desired, additional locking means may be employed at this point. Even if no locking means whatever is employed at this point, the superiority of my continuous lug will be evident insomuch as it serves as a continuous stay strip and locking means which prevents deformation of the clenching portion of the shoe such as could disengage it from the rim or cause pinching of the inner tube, after the manner possible where widely separated lugs are employed. The locking washer 17 being seated in the recess 18, the wrench 27 is unscrewed and a retaining screw 29 is screwed into the recess 28. The head 30 of said screw bears upon an interposed spring washer 31 which holds locking washer 17 in place and also prevents screw 29 from jarring loose.

For convenience in retaining the lug strip in place during removal or insertion of an inner tube, I may employ a detachable bar 60, Fig. 5, adapted to be screwed into the recess 61 in the end of bolt 24. This assists to retain the relaxed and expanded lug strip in position inside the rim and shoe and to guide the bolt 24 back into engagement with the hole 25 when the parts are reassembled. It will be understood that the long wrench 27 performs the same function for the opposite side of the lug strip.

It will be seen that in its broadest aspect my invention provides for approximate continuity of the means for positively locking the shoe in clenching engagement with the rim entirely around the periphery and that the expression "substantially continuous lug" as used herein may include arrangements wherein the circumferential extent of the discontinuities or spaces between separate lugs are small as compared with the circumferential surface in contact with the ground and through which the side thrust takes effect, provided that in such arrangements the member or members performing the function of lugs be held in position by longitudinal tension around the periphery, through members lying within the wedge shaped locking groove or channel formed by the inner converging surfaces of the shoe.

I claim:

1. A rim provided with inturned flanges and a pneumatic tire therefor including a tire shoe of the clencher type provided with circumferential ribs or projections interlocking with said flanges in combination with a continuous lug strip of adjustable length adapted to bear against opposite inner faces of the shoe and thereby positively lock the shoe with its circumferential projections in clenching relation to the flanges of the rim at substantially all points about the circumference thereof, said lug strip being provided with a take-up and lock for the adjusting the same and with an opening for the valve stem of the pneumatic tube at a point of the circumference opposite to said take-up, and with means independent of the valve stem located adjacent said valve stem opening for holding such portion of the lug strip against movement circumferentially of the rim and shoe.

2. A rim provided with inturned flanges and a pneumatic tire therefor including a tire shoe of the clencher type provided with circumferential ribs or projections interlocking with said flanges in combination with a continuous lug strip of adjustable length adapted to bear against opposite inner faces of the shoe and thereby positively lock the shoe with its circumferential projections in clenching relation to the flanges of the rim at substantially all points about the circumference thereof, said lug strip being provided with an adjustable take-up and lock adapted to secure the adjusted portions against circumferential movement relatively to each other and to the rim, said rim and said lug strip being provided with registering openings for the valve stem of the pneumatic tube at a point of the circumference approximately opposite to said take-up and lock.

3. A rim provided with circumferential locking recesses and a pneumatic tire therefor including a tire shoe of the clencher type provided with circumferential ribs or projections interlocking with said recesses in combination with a continuous lug strip adapted to bear against opposite inner faces of the shoe and thereby positively lock the circumferential projections of the shoe in clenching relation to the recesses of the rim at substantially all points about the circumference thereof, said lug strip being provided with a take-up and lock for adjusting the same, comprising a rotary member and a washer slidable on said member but held against rotation thereon, said rim having a locking recess adapted to receive said washer and to hold the same and said member against turning.

4. A rim and tire shoe of the clencher type, provided with interlocking circumferential ribs or projections, in combination with a continuous lug strip provided with toothed overlapped ends, a rotary toothed member for taking up said ends, and a washer slidable on said member but held against rotation thereon, said rim having a locking recess adapted to receive said washer and to hold the same and said member against turning.

Signed at New York city, in the county of New York and State of New York, this nineteenth day of November, A. D. 1908.

MILLER REESE HUTCHISON.

Witnesses:
M. L. BROWNE,
IRVING M. OBRIEGHT.

---

Copies of this patent may be obtained for five cents each, by addressing the "Commissioner of Patents, Washington, D. C."